United States Patent [19]

Duke

[11] Patent Number: 5,257,432
[45] Date of Patent: Nov. 2, 1993

[54] ROD WIPER

[75] Inventor: J. Thomas Duke, Hunter, Utah

[73] Assignee: Macrotech Fluid Sealing, Inc., Salt Lake City, Utah

[21] Appl. No.: 972,256

[22] Filed: Nov. 5, 1992

[51] Int. Cl.$^5$ .............................................. B08B 1/02
[52] U.S. Cl. ................................ 15/104.04; 15/256.5; 15/256.53
[58] Field of Search .............. 15/104.04, 256.5, 256.53

[56] References Cited

U.S. PATENT DOCUMENTS

| | | | |
|---|---|---|---|
| 2,884,654 | 5/1959 | Fall | 15/104.04 |
| 3,266,810 | 8/1966 | Reeser | 15/256.5 X |
| 4,577,363 | 3/1986 | Wyse | 15/256.5 |
| 4,621,386 | 11/1986 | Hill | 15/256.5 X |
| 4,658,894 | 4/1987 | Craig | 15/104.04 X |

Primary Examiner—Chris K. Moore
Attorney, Agent, or Firm—Lyman R. Lyon

[57] ABSTRACT

A rod wiper for disposition about the rod of a fluid actuator comprises an annular wiper element of relatively high durometer having a pair of axially spaced lips engageable with the rod of the actuator, and an annular elastomeric element of relatively lower durometer disposed radially outwardly of said wiper element. The elastomeric element is normally engaged with only the wiper element and with an axial wall of a rod housing. However, the elastomeric element is movable into engagement with a radial wall of the rod housing in the presence of dirt and scale on the rod. The axial force on the elastomeric element results in an increased bias of the lips of the wiper element on the rod.

4 Claims, 1 Drawing Sheet

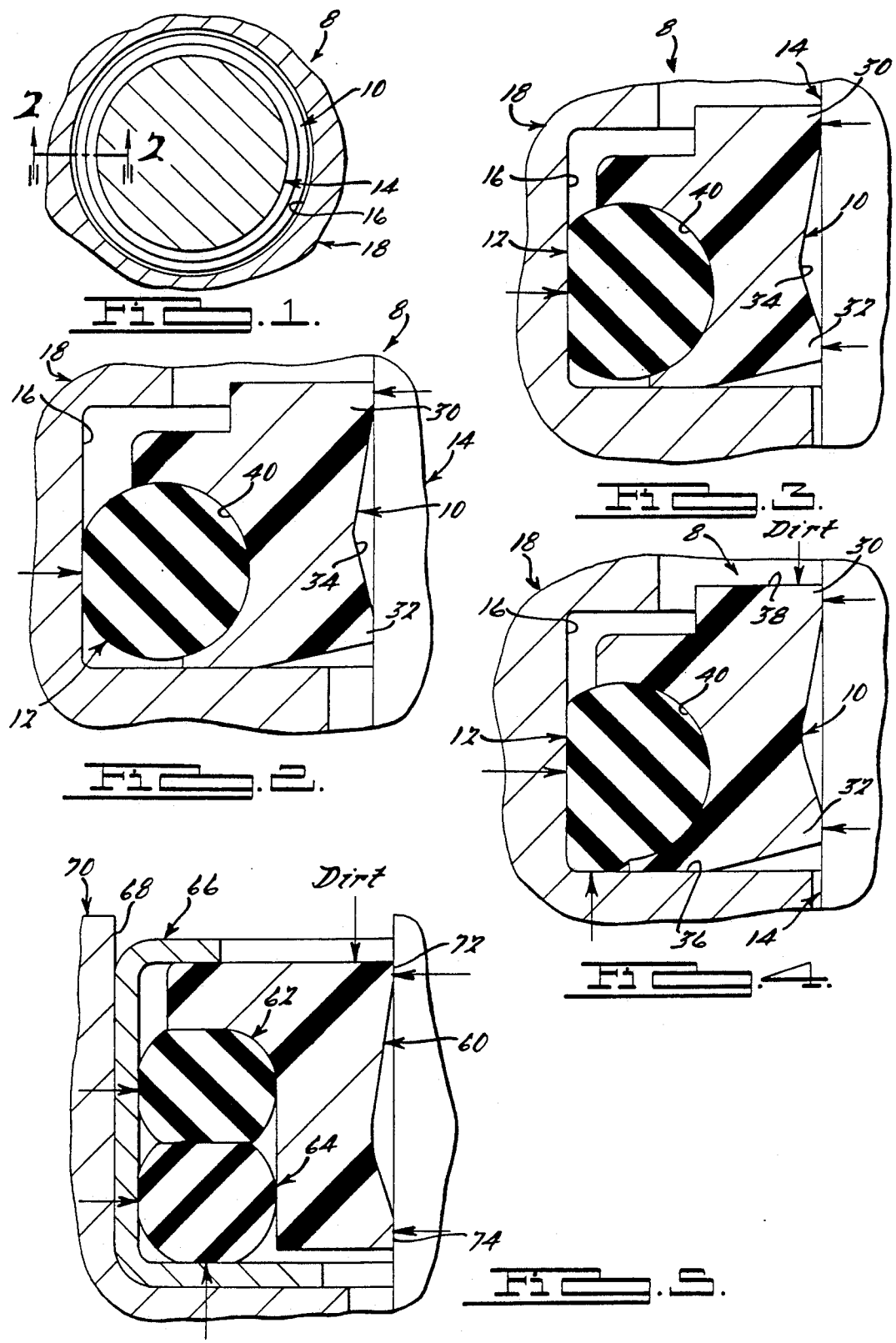

ROD WIPER

BACKGROUND OF THE INVENTION

Hydraulic or pneumatic actuators often utilize a wiper about the rod thereof to preclude the passage of dirt to a seal assembly. Such rod wipers generally comprise an annular relatively hard wiper element having a lip that engages the radially outer cylindrical surface of the rod. The wiper element is generally mechanically retained within a complementary annulus or retaining ring in the actuator housing. Springs are often utilized to maintain a radially inward bias of the wiper element on the rod. However, known rod wipers are generally relatively ineffective in the presence of severe rod eccentricity and when excessive dirt or scale builds upon the actuator rod.

SUMMARY OF THE INVENTION

The rod wiper of the present invention comprises a relatively hard wiper element of novel cross section that is biased against the actuator rod by a relatively softer elastomeric element. Lateral travel of the wiper element, while maintaining a bias on the rod, is maximized by the geometry of the wiper element and its biasing system thereby to minimize the effect of rod eccentricity. Moreover, buildup of dirt and scale on the rod tends to increase the wiping capacity of the wiper as opposed to compromising wiper capability.

Yet another advantage offered by the rod wiper of the present invention is that superior initial rod wiping and film breaking action is exhibited in applications where severe dirt conditions, high fluid viscosity and low temperatures are encountered.

The aforesaid advantages are achieved by the geometry and orientation of the elastomeric and wiper elements which transform axial loading on the wiper element due to dirt and scale, to radial force of the wiper element lip against the rod surface.

BRIEF DESCRIPTION OF THE DRAWINGS

FIG. 1 is a cross section through an actuator rod provided with the rod wiper of the present invention;

FIG. 2 is a cross-sectional view taken along the line 2—2 of FIG. 1 with the wiper radially displaced to the right due to rod eccentricity;

FIG. 3 is a view similar to FIG. 2 showing the rod wiper in a normal axially loaded condition;

FIG. 4 is a cross-sectional view similar to FIG. 3 showing the rod wiper displacement due to dirt and scale; and FIG. 5 is a cross-sectional view of a second embodiment of the invention.

DETAILED DESCRIPTION OF THE PREFERRED EMBODIMENT OF THE INVENTION

As seen in FIGS. 2-5, a rod wiper assembly 8 comprises a wiper element 10 and a resilient, elastomeric element 12. The element 12 is disposed radially outwardly of the wiper element 10 so as to bias the element 10 against a rod 14. The wiper element 10 is made of relatively hard material such as synthetic rubber having a durometer of approximately 50 on the Shore D Scale. The elastomeric element 12 is of circular cross section, for example, an O-ring, and is made from a relatively soft, deformable elastomer, for example, rubber or polyurethane having a durometer of approximately 80 on the Shore A Scale. In all cases the material of the wiper element 10 is harder and less readily deformable than the material of the elastomeric element 12. As seen in FIGS. 1-4, the rod wiper assembly 8 is disposed in an annular recess 16 in an actuator housing 18.

In accordance with one feature of the instant invention, the wiper element 10 has a pair of axially spaced annular lips 30 and 32 that are engaged at all times with the rod 14. The wiper element 10 has a concave section 34 between the lips 30 and 32 to accommodate radial compression of the lips 30 and 32. In the installed condition shown in FIGS. 2-4, the central recess 34 between the lips 30 and 32 of the wiper element 10 is deformed to accommodate the aforesaid deflection of the lips 30 and 32 thereby to maintain a bias on the rod 14 even though there is no significant fluid pressure within housing 18. Stated in another manner, the lips 30 and 32 of the element 10 are deformed by the radial bias on the element 10 by the element 12 upon installation so as to exhibit initial sealing contact with the rod 14.

As seen in FIG. 4, the bias of the lip 30 of the wiper element 10 on the rod 14 is increased when the rod 14 is covered with dirt or sale by the interaction between the wiper element 10, the elastomeric element 12, and an end wall 36 of the recess 16 in the housing 18. The interaction between the elastomeric element 12 and wiper element 10 is facilitated by an arcuate concave face 40 on the rod wiper element 10. The face 40 on the wiper element 10 is radially spaced from the sealing lips 30 and 32 but is oriented closer to the lip 32. Since the elastomeric element 12 exhibits the essentially non-compressible attributes of a fluid, its bias on the wiper element 10 can be resolved as shown by the arrows in FIGS. 2-4. Dirt and scale operating on an upper face 38 of the wiper element 10 pushes the wiper element 10 and elastomeric element 12 downwardly until the elastomeric element 12 engages the end face 36 of the recess 16 in the housing 18. When this condition obtains, an upward bias on the elastomeric element 12 increases the bias of the lip 30 on the rod 14 since the lip 32 functions essentially as a fulcrum about which the wiper element 10 rotates.

Stated in another manner, the wiper element 10 functions as a beam having support points 30 and 32. Dirt, scale, etc., acting on the rod wiper element 10 exerts a downward force on the wiper element 10, as seen in the drawings, giving rise to reaction forces in the elastomeric element 12. Resolution of the reaction forces acting on the element 10 results in the lip 32 acting as a fulcrum, which maximizes the ability of the lip 30 to follow the rod 14 while maintaining a scraping force on the rod 14 at all conditions of rod eccentricity. Moreover, the radial wiping force on the lip 32 is increased by the axial force applied to the wiper element 10 by dirt and scale.

From the foregoing it should be apparent that the rod wiper assembly 10 of the present invention has the ability to convert axial load resulting from scraping debris off the cylinder rod 14 into increased wiping force of the scraper lip 30 of the wiper element 10 on the rod 14. The axial force generated by the debris is first applied against the wiper element 10 thence transferred to the elastomeric element 12 which behaves like a viscous fluid. The reaction force of the element 12 is transferred, in part, back to the wiper element 10 as a radial force. The rod wiper 10 can be viewed as a beam that rotates about the "fulcrum" 44 so as to maintain the lip 30 in contact with the rod 14.

As seen in FIG. 5, a second embodiment of the invention comprises a rod wiper element 60 and a pair of elastomeric elements 62 and 64 that are enclosed in a retainer 66. The retainer is adapted to be accepted in a recess 68 in a rod housing 70.

Loading of the wiper element 60 due to dirt and scale effects a downward bias thereon which effects axial compression of the elastomeric elements 62 and 64. The reaction force of the retainer 66 on the elastomeric elements 62 and 64 is resolved by an increased bias on a sealing lip 72 of the wiper element 60. The wiper element 60 tends to rotate about a lower sealing lip 74 as in the embodiment discussed heretofore.

While the preferred embodiment of the invention has been disclosed, it should be appreciated that the invention is susceptible of modification without departing from the scope of the following claims.

I claim:

1. A rod wiper for disposition about the rod of a fluid actuator comprising an annular wiper element having a durometer of approximately 50 on the Shore D Scale and having a radial cross section that defines a pair of axially spaced lips engageable with the rod of said actuator and a radially outwardly extending portion, and an annular elastomeric element having a durometer of approximately 80 on the Shore A Scale, said elastomeric element being disposed radially outwardly of the lips on said wiper element and axially aligned with the radially outwardly extending portion of said wiper element, said elastomeric element being engaged with the radially outwardly extending portion of said wiper element and with an axially extending wall on the rod housing at a point generally radially aligned with one of the lips on said wiper element, said elastomeric element being engageable with a radially extending wall of the rod housing, whereby an axial force on said wiper element is transferred to said elastomeric element which in turn transfers said force radially to the other lip on said wiper element.

2. A rod wiper in accordance with claim 1 wherein said wiper element has a concave surface between the lips thereof that is engaged by said elastomeric element.

3. The rod wiper of claim 1 wherein said wiper element has an annular concave section between said axially spaced lips.

4. The rod wiper of claim 1 wherein said elastomeric element is of circular cross section.

* * * * *